G. MASSIP.
VALVE.
APPLICATION FILED JULY 29, 1920.

1,406,748.

Patented Feb. 14, 1922.

INVENTOR:
GEORGES MASSIP.
ATTORNEY.

UNITED STATES PATENT OFFICE.

GEORGES MASSIP, OF PARIS, FRANCE.

VALVE.

1,406,748.  Specification of Letters Patent.  Patented Feb. 14, 1922.

Application filed July 29, 1920. Serial No. 399,833.

*To all whom it may concern:*

Be it known that I, GEORGES MASSIP, a citizen of the French Republic, and resident of Paris, France, have invented certain new and useful Improvements in Valves, of which the following is a specification.

The present invention relates to a shut off valve for fluids of any kind in which the maximum open position may be regulated and the plug put in the position of maximum discharge without the necessity of taking the valve apart.

Figure 1:
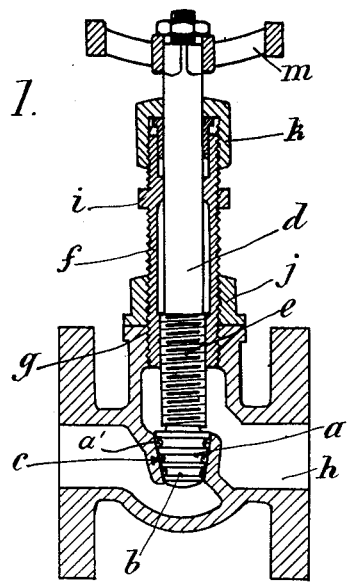
Figure 2:
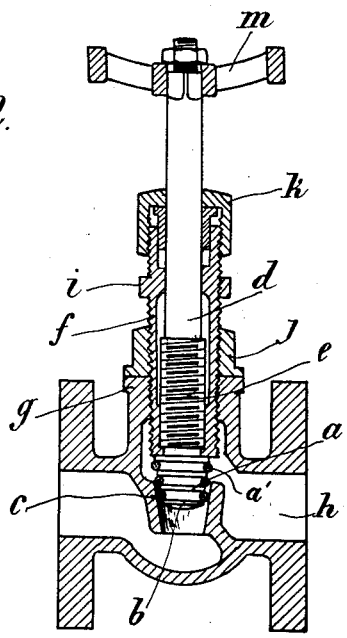

The accompanying drawing shows a valve constructed according to the invention, Figures 1 and 2 showing in axial section the valve with the plug in two different positions.

The device comprises a valve body $h$ provided with two connections for being inserted into a duct through which flows any fluid. Within the body $h$ is provided a valve seat $c$ on which may be applied a plug $a$ provided with a plurality of grooves $b$ for receiving a series of packing rings $a'$.

Plug $a$ is integral with a stem or bolt $d$ operated by a hand wheel or the like $m$ and is provided with a threaded portion $e$ which threads into the sleeve $f$, said sleeve being provided with external threads having engagement with the threaded portion of the valve body. The sleeve is provided at $i$ with a hexagonal portion adapted to receive a wrench for turning said sleeve, and a lock nut $j$ for locking the sleeve against rotation in the body when it is in an adjusted position. A stuffing box $k$ of any convenient type serves for providing a tight joint along the stem $d$.

Fig. 1 illustrates the device when the valve is wholly closed, plug $a$ being applied upon its seat and sleeve $f$ being fixed in position by means of the lock nut $j$. When operating the hand wheel $m$, plug $a$ may be opened until the head portion of same reaches the lower edge of sleeve $f$. This latter position corresponds to the maximum discharge for the particular position in which the sleeve $f$ is adjusted.

When it is desired to decrease the delivering capacity of the valve, lock nut $j$ is unscrewed, then, plug $a$ being fully open, that is, bearing on the lower edge of sleeve $f$, the latter is screwed within the body until the delivery of the valve attains the required amount. In this position, the lock nut $j$ is set, which latter locks the sleeve $f$ against rotation in the body. In this second position, as shown in Fig. 2, the opening of the plug is limited to the required amount as above stated, the lower edge of the sleeve $f$ forming a stop and preventing plug $a$ from being opened to a greater amount than that corresponding to the delivery for which it has been adjusted.

Marks may be provided on the outside of the valve, indicating the position of sleeve $f$ corresponding to each maximum opening. Likewise the plug may be locked in its closed position by screwing the sleeve $f$ down, until it becomes applied upon a plug $a$ whilst the latter is applied on its seat.

Plug $a$ may be made of any convenient material, provided that a satisfactory tight joint may be had when it is applied on its seat.

The plug $a$ and the seat $c$ are conical or tapered in form and have a large bearing surface as shown. The grooves $b$ provide for a plurality of packing rings adapted to engage the seat $c$, so that when the valve is closed, leakage is absolutely prevented and in case part of the packing wears out or is blown out, the remaining rings will still close the passage to fluids. This valve is particularly adapted to use on high pressure systems, where leakage is frequent and hard to overcome.

When the valve is used in a high pressure line, the sleeve $f$ as will be noted cooperates with the plug to lock it in closed position as well as provide a stop and support for it in opened or partially opened position.

The invention may be applied in all cases where the passage of any fluid should be intercepted in a very tight manner and where it is desired to regulate the maximum delivery.

While this specification sets forth in detail the present and preferred construction of the device, still in practice such deviations from such detail may be resorted to as do not form a departure from the spirit of the invention as defined by the appended claim.

Having now fully described my said invention, what I claim and desire to secure by Letters Patent, is:

A valve comprising a body formed with a passage and a tapered valve seat, a plug formed with a plurality of peripheral grooves, and having a plurality of packing rings secured in said grooves, the plug adapted to contact with the tapered valve seat at a plurality of points and be out of contact with the seat at other points to insure the closure to the passage of fluids.

In testimony whereof I have hereunto set my hand in presence of two witnesses.

GEORGES MASSIP.

Witnesses:
GEORGES DELBROUCK,
CLEMENT S. EDWARDS.